United States Patent
Kim et al.

(10) Patent No.: US 9,973,383 B2
(45) Date of Patent: May 15, 2018

(54) PLACEMENT OF WAVELENGTH SHIFTERS IN OPTICAL NETWORKS

(71) Applicant: Fujitsu Limited, Kawasaki-shi, Kanagawa (JP)

(72) Inventors: Inwoong Kim, Allen, TX (US); Xi Wang, Murphy, TX (US); Paparao Palacharla, Richardson, TX (US); Tadashi Ikeuchi, Plano, TX (US)

(73) Assignee: Fujitsu Limited, Kawasaki (JP)

(*) Notice: Subject to any disclaimer, the term of this patent is extended or adjusted under 35 U.S.C. 154(b) by 0 days. days.

(21) Appl. No.: 14/880,910

(22) Filed: Oct. 12, 2015

(65) Prior Publication Data
US 2017/0104632 A1    Apr. 13, 2017

(51) Int. Cl.
| | |
|---|---|
| *H04L 12/24* | (2006.01) |
| *H04Q 11/00* | (2006.01) |
| *H04L 12/721* | (2013.01) |
| *H04J 14/02* | (2006.01) |

(52) U.S. Cl.
CPC ...... *H04L 41/0826* (2013.01); *H04J 14/0212* (2013.01); *H04J 14/0217* (2013.01); *H04J 14/0257* (2013.01); *H04L 41/145* (2013.01); *H04L 45/123* (2013.01); *H04Q 11/0066* (2013.01); *H04Q 2011/0047* (2013.01); *H04Q 2011/0079* (2013.01)

(58) Field of Classification Search
CPC . H04L 41/0826; H04L 41/145; H04L 45/123; H04Q 11/0066; H04Q 2011/0047; H04Q 2011/0079
See application file for complete search history.

(56) References Cited

U.S. PATENT DOCUMENTS

2004/0220886 A1* 11/2004 Kumaran ........... G06Q 30/0283 705/400

OTHER PUBLICATIONS

Hung Nguyen Tan et al., "Cascaded Operation of Wavelength Converter for Dual-Polarization Phase-Modulated Signal," Optical Fibre Technology, 2014 OptoElectronics and Communication Conference, Melbourne, Australia; 3 pages, Jul. 2014.

* cited by examiner

*Primary Examiner* — Leslie C Pascal
(74) *Attorney, Agent, or Firm* — Baker Botts L.L.P.

(57) ABSTRACT

Methods and systems enable optimized placement of wavelength shifters in optical networks. The wavelength shifters may include O-E-O regenerators for a single wavelength and all optical wavelength shifters for one or more wavelengths. An auxiliary graph is used to represent various links in a provisioned optical path. By applying cost values to each of the links, different types of optimizations for network resource utilization may be realized.

16 Claims, 6 Drawing Sheets

PLACEMENT OF WAVELENGTH SHIFTERS IN OPTICAL NETWORKS

BACKGROUND

Field of the Disclosure

The present disclosure relates generally to optical communication networks and, more particularly, to placement of wavelength shifters in optical networks.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, etc. configured to perform various operations within the network.

The function of computation of an optical signal path through the various network elements is a core function for design, modeling, management, and control of optical networks. Optical path computation may enable operators of an optical network to customize, control and update network policies. One feature of optical path computation involves determination of end-end reachable optical paths from a source node to a destination node. When the source node and the destination node are determined to be 'directly reachable', then one or more paths exist in the optical network between the source node and the destination node that are all-optical paths.

Absent direct reachability from the source node to the destination node, an optical signal will be electrically regenerated using optical-electrical-optical (O-E-O) regenerators along a given signal path, which may involve greater network resources and may be less cost effective. When regenerators are used, an end-end reachable path may include a certain number of regenerators between the source node and the destination node. Thus, one challenging goal in optical path computation may be finding an end-end reachable path that includes a minimum or a specified number of regenerators, in addition to satisfying other path constraints, for example, such as a desired level of signal latency or cost.

Additionally, O-E-O regenerators may be used for recoloring a wavelength in optical networks, where a certain wavelength channel (or wavelength slot) is shifted to a different wavelength. Recently, all optical wavelength shifters have been proposed that change the path constraints for optical path computation as compared to using O-E-O regenerators.

SUMMARY

In one aspect, a disclosed method is for placement of wavelength shifters in optical networks. The method may include, for an optical path from a source node to a destination node in an optical network, determining physical nodes between the source node and the destination node, the physical nodes including the source node, the destination node, and recoloring nodes. The method may also include determining passthrough segments between the physical nodes for the optical path, the passthrough segments comprising optical fiber segments enabled to transmit a plurality of wavelength channels. The method may also include generating an auxiliary graph for the optical path, the auxiliary graph based on wavelength channels provisioned between the source node and the destination node. In the method, generating the auxiliary graph may further include, based on the wavelength channels provisioned at the physical nodes and the passthrough segments, generating virtual nodes for each of the physical nodes, the virtual nodes including virtual input nodes and virtual output nodes. In the method, the source node and the destination node may include virtual terminal nodes. In the method, generating the auxiliary graph may also include generating, at the source node, source links between the virtual terminal node and the virtual output nodes, generating, at the destination node, destination links between the virtual terminal node and the virtual input nodes, and generating passthrough links corresponding to the passthrough segments, each of the passthrough links indicative of a wavelength channel respectively provisioned at the passthrough segment. In the method, generating the auxiliary graph may still further include generating, at each of the recoloring nodes, recoloring links between the virtual input nodes and the virtual output nodes, the recoloring links comprising no-recolor links, optical-electrical-optical (O-E-O) regeneration links, and optical wavelength shifter links. In the method, the recoloring links may be indicative of recoloring functionality existing at each of the recoloring nodes. In the method, generating the auxiliary graph may also include associating a cost value, respectively, with each of the source links, each of the destination links, each of the passthrough links, each of the no-recolor links, and each of the recoloring links. In the method, the cost value for the passthrough links may be respectively associated with the wavelength channel for each of the passthrough links. In the method, generating the auxiliary graph may yet further include associating a new cost value, respectively, for new recoloring links, including new O-E-O regeneration links and new optical wavelength shifter links. The method may also include, based on the cost values and the new cost values, determining a lowest cost optical path between the source node and the destination node.

In any of the disclosed embodiments of the method, the source links, the destination links, and the no-recolor links may be associated with the cost value of zero. In any of the disclosed embodiments of the method, the optical wavelength shifter links may be associated with the cost value of zero.

In any of the disclosed embodiments of the method, the new cost value for the new optical wavelength shifter links may be selected to be greater than the cost value for the passthrough link having a highest wavelength channel times a number of hops in the optical path.

In any of the disclosed embodiments of the method, the new cost value for the new optical wavelength shifter links may be selected to be less than the cost value for the passthrough link having a lowest wavelength channel and less than a cost difference between consecutive wavelength channels.

In any of the disclosed embodiments of the method, the new cost value for the new optical wavelength shifter links may be selected to be equal to the cost value for a passthrough link.

In any of the disclosed embodiments of the method, the recoloring nodes may include reconfigurable optical add-drop multiplexer nodes using wavelength selective switches in a matrix switch configuration.

In any of the disclosed embodiments of the method, the recoloring nodes may include reconfigurable optical add-drop multiplexer nodes using multicast switches.

Additional disclosed aspects for placement of wavelength shifters in optical networks include a control system and an optical transport network, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Figure 1:
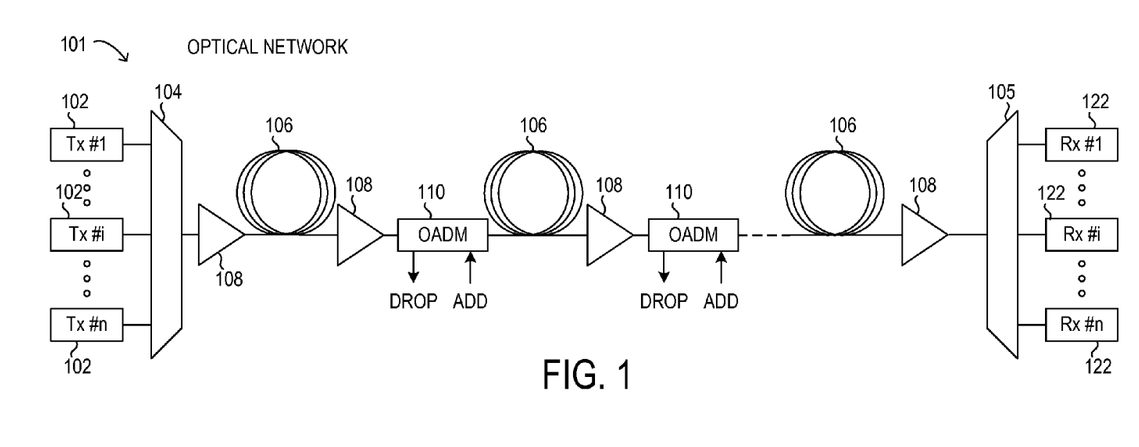
FIG. 1 is a block diagram of selected elements of an embodiment of an optical network.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 122.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wide-band optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump (or simply 'pump') to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) or a multicast switch (MCS) that may be included in a ROADM (see also FIGS. 4A and 4B).

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 122 coupled to demultiplexer 105. Each receiver 122 may receive optical signals transmitted at a particular wavelength or channel, and may process the optical signals to obtain (e.g., demodulate) the information (i.e., data) that the optical signals contain. Accordingly, network 101 may include at least one receiver 122 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, or a hierarchical network topology.

As noted above, recoloring in optical networks refers to shifting wavelength channels to different wavelengths. Because of spectral slot fragmentation, network resource utilization in optical networks may be limited without the use of recoloring. One method of recoloring involves the use of O-E-O regenerators, which is limited to a single channel. Recently, recoloring using an all-optical process with a low optical signal-to-noise ratio (OSNR) penalty has been described using an all optical wavelength shifter, shown in FIG. 1A, which is also associated with lower cost and more operational flexibility than an O-E-O regenerator. Table 1 below illustrates two metrics used in quantifying network resource utilization: a network load ratio and a network fill rate.

TABLE 1

Example of network link-slot loading

| WAVELENGTH | LINK1 | LINK2 | LINK3 |
|---|---|---|---|
| $\lambda_4$ | empty | used | empty |
| $\lambda_3$ | used | used | empty |
| $\lambda_2$ | empty | used | used |
| $\lambda_1$ | used | empty | empty |

In Table 1, an optical path consisting of three links, LINK1, LINK2, and LINK3 is assumed to be provisioned with four wavelength slots, $\lambda_2$, $\lambda_3$, and $\lambda_4$. The actual loading of each link for each wavelength is shown in Table 1 as used or empty. For this example, the network load ratio is calculated as a ratio of the used wavelength slots (6) to the total number of wavelength slots (12), or 0.5. The network fill rate, however, only considers wavelength slots up to the highest filled slot for each link. Thus, for LINK1, the highest filled slot is $\lambda_3$, such that $\lambda_4$ is omitted from calculating the network fill rate, and the network fill rate is 0.75. For LINK2, all the four wavelength slots, $\lambda_1$, $\lambda_2$, $\lambda_3$, and $\lambda_4$ are considered, and the network fill rate is 1.0. For LINK3, the highest filled slot is $\lambda_2$, such that $\lambda_3$ and $\lambda_4$ are omitted from calculating the network fill rate, and the network fill rate is 0.50. In aggregate, the network fill rate is 6/9=0.67 for the example shown in Table 1.

Figure 1A:
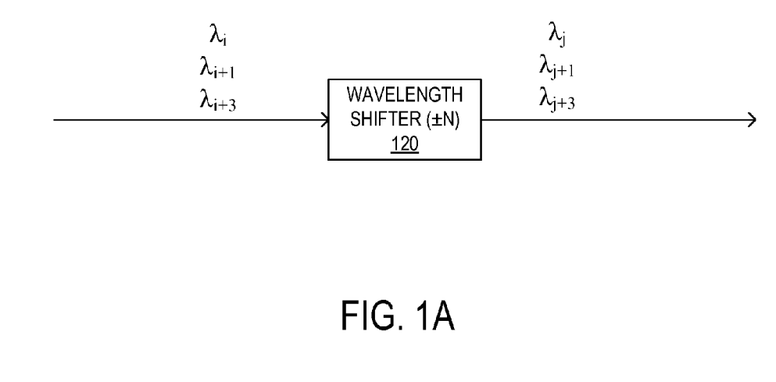
FIG. 1A is a block diagram of selected elements of an embodiment of an optical wavelength shifter usable in optical networks.

Referring now to FIG. 1A, a block diagram of selected elements of an all optical wavelength shifter 120 are shown. Wavelength shifter 120 is shown as an optical element that can be used in optical network 101. Wavelength shifter 120 is correspondingly operable to shift an input wavelength $\lambda_i$ to an output wavelength $\lambda_j$ representing a shift of N wavelength slots, where $N=|i-j|$. Additionally, because wavelength shifter 120 works using an all-optical process, wavelength shifter 120 operates to shift all input wavelength channels a spectral amount equal to N wavelength slots. Thus, as shown in FIG. 2, wavelength shifter 120 may receive input wavelengths $\lambda_i$, $\lambda_{i+1}$, and $\lambda_{i+3}$, which are then shifted to output wavelengths $\lambda_j$, $\lambda_{j+1}$, and $\lambda_{j+3}$, where $\omega_i-\omega_j=\omega_{i+1}-\omega_{j+1}=\omega_{i+3}-\omega_{j+3}$ and where $\omega_x$ is the angular frequency of a corresponding wavelength $\lambda_x$.

As will be described in further detail, methods and systems are disclosed herein for placement of wavelength shifters in optical networks. The methods and systems disclosed herein for placement of wavelength shifters in optical networks consider global information for a given optical routing path that has been provisioned, such as available wavelength slots for each optical link, available existing wavelength shifters, and the availability of new wavelength shifters at particular network nodes. The wavelength shifters may be O-E-O regenerators or optical wavelength shifters, such as wavelength shifter 120. The methods and systems disclosed herein for placement of wavelength shifters in optical networks generate an auxiliary graph to evaluate recoloring options for the given optical routing path. The auxiliary graph includes source links, destination links, passthrough links, no-recolor links, O-E-O regeneration links, and optical wavelength shifter links. Additionally, virtual nodes are used in the auxiliary graph to represent actual physical nodes in the optical path. To evaluate the auxiliary graph to determine optimal placement of wavelength shifters, a cost value is associated with each type of link in the auxiliary graph. The cost values for certain links may be judiciously selected to implement (or favor) a particular strategy for network resource utilization that may be desired. Based on the sum of the cost value for different routing paths in the auxiliary graph, a lowest cost optical path may be determined.

Figure 2:
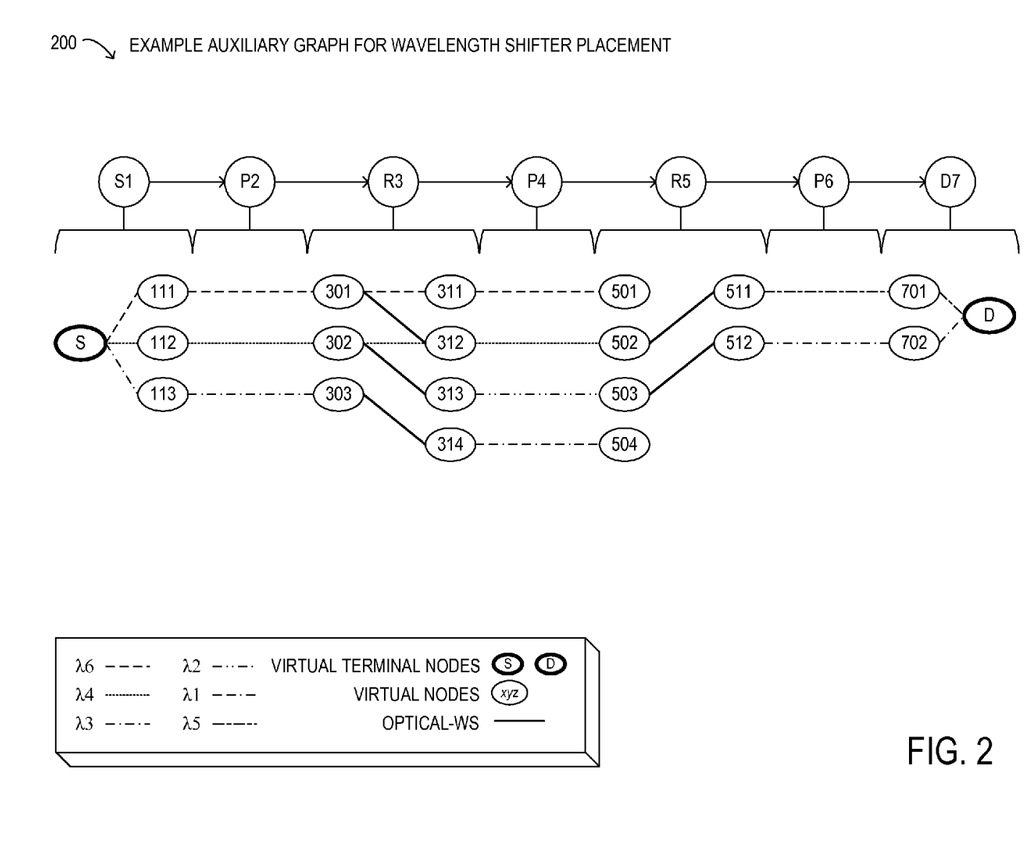
FIG. 2 is a block diagram of selected elements of an embodiment of auxiliary graph for wavelength shifter placement.

Referring now to FIG. 2, selected elements of an example embodiment of auxiliary graph 200 are shown as a diagram. FIG. 2 is a schematic illustration and is not drawn to scale. Auxiliary graph 200 depicts various aspects of existing network infrastructure associated with a provisioned optical path. As will be described in further detail, additional infrastructure may be represented in auxiliary graph 200 as new links (not shown in FIG. 2) that may be added to evaluate new wavelength shifters and associated cost values, for example. It is noted that auxiliary graph 200 is shown in simplified form for descriptive clarity, and that the generation and use of auxiliary graph 200 in different embodiments may be applied to networks and optical paths of varying complexity, including very large and complex optical paths with large numbers of nodes and wavelength channels.

In the exemplary embodiment of auxiliary graph 200, the optical path is defined along 7 physical nodes, given as source node S1, passthrough node P2, recolor node R3, passthrough node P4, recolor node R5, passthrough node P6, and destination node D7. Passthrough nodes P2, P4, and P6 represent passthrough segments of optical fiber that are enabled to transmit a plurality of wavelength channels. Accordingly, passthrough nodes P2, P4, and P6 do not include any virtual nodes in auxiliary graph 200. The other physical nodes include virtual nodes, including virtual terminal nodes, input virtual nodes, and output virtual nodes. Two virtual terminal nodes are included in auxiliary graph 200 corresponding to source node S1 and destination node D7, where an optical signal is generated and terminates, respectively. Additional, input and output virtual nodes are shown with an xyz numerical code, where x is the node number, y is 0 for input and 1 for output, and z corresponds to an ordinal number for a given node that is not associated with wavelength slots. The different wavelengths associated with 6 incremental wavelength slots, $\lambda 1$, $\lambda 2$, $\lambda 3$, $\lambda 4$, $\lambda 5$, and $\lambda 6$ are shown with varying line patterns as links between the virtual nodes, as will be described in further detail. In the example embodiment of auxiliary graph 200, it is assumed that wavelength slots $\lambda 6$, $\lambda 4$, and $\lambda 3$ are available between source node S1 and recoloring node R3, wavelength slots $\lambda 6$, $\lambda 4$, $\lambda 2$ and $\lambda 1$ are available between recoloring node R3 and recoloring node R5, wavelength slots $\lambda 5$ and $\lambda 3$ are available between recoloring node R5 and destination node D7.

Accordingly, in auxiliary graph 200, source node S1 comprises virtual terminal node S having three wavelength slots, $\lambda 6$, $\lambda 4$, and $\lambda 3$, which are output to virtual output nodes 111, 112, 113, respectively. At recolor node R3, the three wavelength slots $\lambda 6$, $\lambda 4$, and $\lambda 3$ are received at virtual input nodes 301, 302, 303, respectively. In recolor node R3, wavelength slots $\lambda 6$ and $\lambda 4$ may be routed along no-recolor links between virtual input nodes 301, 302 and virtual output nodes 311, 312, respectively. Additionally, it is assumed that recolor node R3 has an optical wavelength shifter for $N=-2$ (not shown) that is available for use and sharing at recolor node R3 and is represented in auxiliary graph 200 by recoloring links between virtual nodes 301-312, 302-313, and 303-314 where a 2-slot wavelength downshift is available. Accordingly, recolor node R3 has four virtual output nodes for four wavelength slots, 311 ($\lambda 6$), 312 ($\lambda 4$), 313 ($\lambda 2$), and 314 ($\lambda 1$). At recolor node R5, four virtual input nodes, 501 ($\lambda 6$), 502 ($\lambda 4$), 503 ($\lambda 2$), and 504 ($\lambda 1$), respectively receive the four wavelength slots from recolor node R3 via passthrough node P4. In recolor node R5, no further optical path has been provisioned for wavelength slots $\lambda 6$ and $\lambda 1$, which terminate at recolor node R5. Additionally, it is assumed that recolor node R5 has an optical wavelength shifter for $N=+1$ (not shown) that is available for use and sharing at recolor node R5 and is represented in auxiliary graph 200 by recoloring links between virtual nodes 502-511 and 503-512, where a 1-slot wavelength upshift is available. It is noted that recolor node R5 does not have any no-recolor links. Accordingly, recolor node R5 has two virtual output nodes for two wavelength slots, 511 ($\lambda 5$) and 512 ($\lambda 3$). After passthrough node P6, destination node D1 comprises virtual terminal node D having two wavelength slots, $\lambda 5$ and $\lambda 3$, which are received by virtual input nodes 701 and 702, respectively.

As noted previously, auxiliary graph 200 as shown depicts existing network infrastructure as a basis for finding a lowest cost path solution. To solve recoloring for placement of wavelength shifters in optical networks using auxiliary graph 200, new recoloring links may be added to represent certain new wavelength shifters added for evaluating the solution, depending on the criteria and assumptions. In some instances, new wavelength shifters cannot be installed due to equipment or other physical constraints at certain recoloring nodes. For some cases, a new optical wavelength shifter or O-E-O regenerator may be added to drive a given goal or cost policy by finding a recoloring solution that results in the lowest cost from source node S1 to destination node D7, such as in the examples described below with respect to FIG. 3. It is noted that O-E-O regenerators are not sharable for multiple wavelength recoloring.

Figure 3:
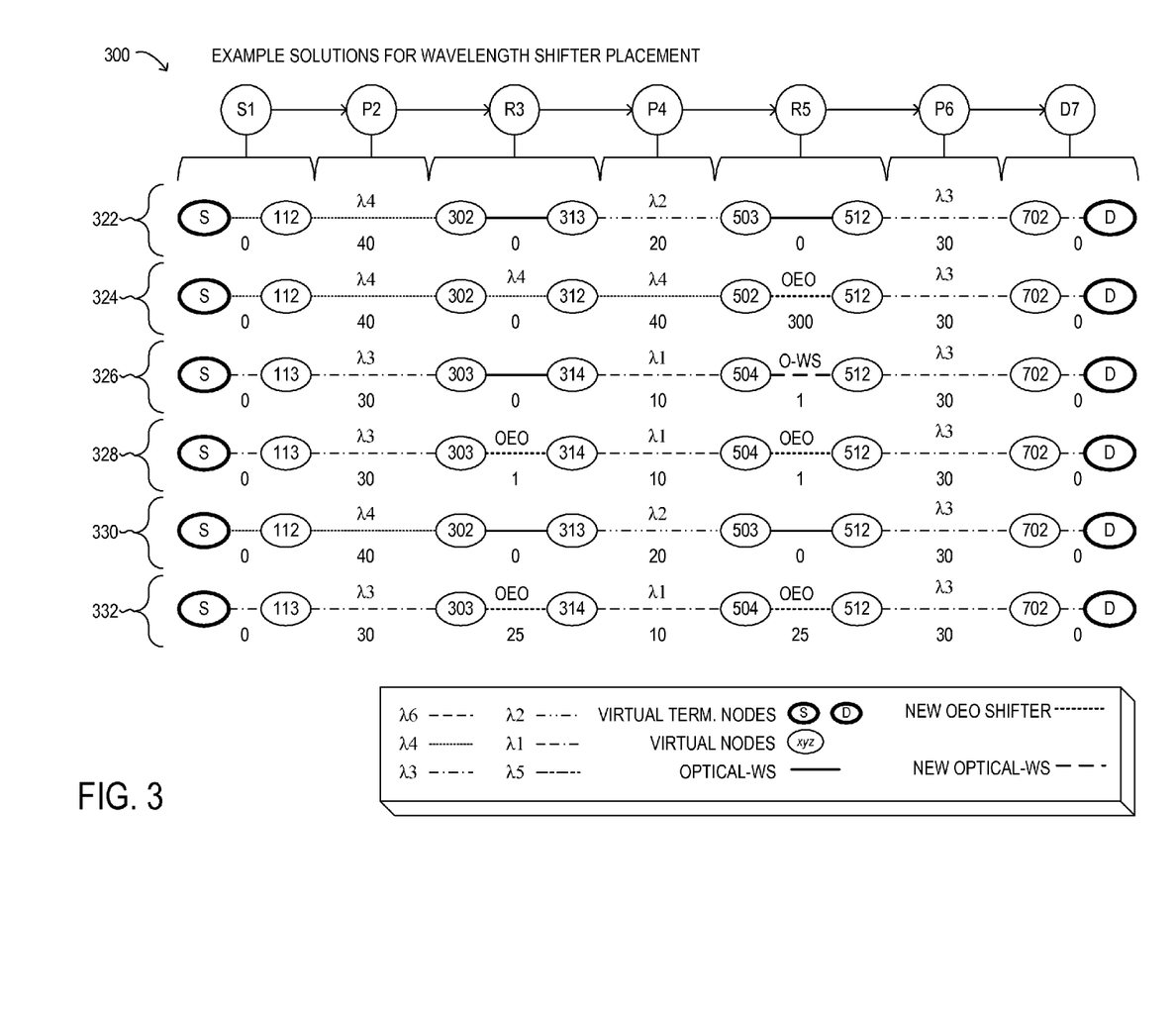
FIG. 3 is a block diagram of selected elements of an embodiment of example solutions using an auxiliary graph for wavelength shifter placement.

Referring now to FIG. 3, selected elements of example solutions 300 for placement of wavelength shifters using auxiliary graph 200 are shown. FIG. 3 is a schematic illustration and is not drawn to scale. In FIG. 3, solutions 322-332 depict six examples of evaluating auxiliary graph 200 based on selected cost information, in the form of cost values associated with different links. As will be described below, the cost values for different links may be assigned depending on a desired goal of optimal placement of wavelength shifters corresponding to a desired optimization strategy. In example solutions 300, the cost of wavelength slots 1-6 are given by integer values 10, 20, 30, 40, 50, and 60, respectively.

In FIG. 3, solution 322 for auxiliary graph 200 results as the lowest cost optical path under the following assumptions:
 the cost of wavelength shifting with new device installation is equal to (number of hops in optical path−1)* (highest wavelength slot cost)=(6−1)*(60)=300;
 cost of conversion by an existing wavelength shifter=0 (no sharing cost); and
 cost of no-recolor links=0.

It is noted that as an alternative in solution 322, the cost of wavelength shifting for new device installation may be set equal to (number of nodes supporting wavelength shifting) *(highest wavelength cost slot)=(2)*(60)=120. To obtain solution 322, installation of new optical wavelength shifters is evaluated at recolor node R3 between virtual nodes 301-313, 301-314, 302-311, 302-314, 303-311, 303-312, and 303-313, and at recolor node R5 between virtual nodes 501-511, 501-512, 502-512, 503-511, 504-511, and 504-512. The cost value for new device installation assumed for solution 322 favors the use of existing optical wavelength shifters in auxiliary graph 200. Accordingly, solution 322 results in an overall cost of 90 and a routing path of S-112-302-313-503-512-702-D. Solution 322 may represent a strategy to favor filling existing wavelength slots and minimizing installation of new wavelength shifters, possibly to the detriment of a high network fill rate.

In FIG. 3, solution 324 for auxiliary graph 200 results as the lowest cost optical path under the following assumptions:
 the cost of wavelength shifting with a new O-E-O regenerator installation is equal to (number of hops in optical path−1)*(highest wavelength slot cost)=(6−1)*(60) =300; and
 cost of no-recolor links=0.

It is noted that as an alternative in solution 324, the cost of wavelength shifting for new device installation may be set equal to (number of nodes supporting wavelength shifting) *(highest wavelength cost slot)=(2)*(60)=120. To obtain solution 322, installation of new O-E-O regenerator wavelength shifters is evaluated at recolor node R3 between virtual nodes 301-312, 301-313, 301-314, 302-311, 302-313, 302-314, 303-311, 303-312, 303-313, and 303-314, and at recolor node R5 between virtual nodes 501-511, 501-512, 502-511, 502-512, 503-511, 503-512, 504-511, and 504-512. The evaluation results in a new O-E-O regenerator added at recolor node R5 between virtual nodes 502-512 and solution 324 results in an overall cost of 410 and a routing path of S-112-302-312-502-512-702-D. In solution 324, the O-E-O regenerator between virtual nodes 502 and 512 downshifts a wavelength channel by 1 slot (N=−1). Solution 324 may represent a strategy to look for a longest continuous wavelength slot and install an O-E-O regenerator to shift a single wavelength slot by a desired shift.

In FIG. 3, solution 326 for auxiliary graph 200 results as the lowest cost optical path under the following assumptions:
 the cost of wavelength shifting with new device installation is equal to 1 such that (number of hops in optical path−1)*(cost of new wavelength shifter)<(cost of wavelength slot 1), or (6−1)*(1)=5<10;
 cost of conversion by an existing wavelength shifter=0 (no sharing cost); and
 cost of no-recolor links=0.

It is noted that as an alternative in solution 326, the cost of wavelength for new device installation shifting may be equal to 3 such that (number of nodes supporting wavelength shifting)*(cost of new wavelength shifter)<(cost of wavelength slot 1), or (2)*(3)=6<10. To obtain solution 326, installation of new optical wavelength shifters is evaluated at recolor node R3 between virtual nodes 301-313, 301-314, 302-311, 302-314, 303-311, 303-312, and 303-313, and at recolor node R5 between virtual nodes 501-511, 501-512, 502-512, 503-511, 504-511, and 504-512. The cost value for new device installation assumed for solution 326 favors adding a new optical wavelength shifter in auxiliary graph 200. The evaluation results in a new optical wavelength shifter added at recolor node R5 between virtual nodes 504-512 and solution 326 results in an overall cost of 71 and a routing path of S-113-303-314-504-512-702-D. In solution 326, the new optical wavelength shifter at recolor node R5 between virtual nodes 504 and 512 upshifts a wavelength channel by 2 slots (N=2). Solution 326 may represent a strategy to maximize the network fill rate by installing new optical wavelength shifters.

In FIG. 3, solution 328 for auxiliary graph 200 results as the lowest cost optical path under the following assumptions:
 the cost of wavelength shifting with a new O-E-O regenerator installation is equal to 1 such that (number of hops in optical path−1)*(cost of new O-E-O regenerator)<(cost of wavelength slot 1), or (6−1)*(1)=5<10; and
 cost of no-recolor links=0.

It is noted that as an alternative in solution 328, the cost of a new O-E-O regenerator may be equal to 3 such that (number of nodes supporting wavelength shifting)*(cost of new O-E-O regenerator)<(cost of wavelength slot 1), or (2)*(3)=6<10. To obtain solution 328, installation of new O-E-O regenerator wavelength shifters is evaluated at recolor node R3 between virtual nodes 301-312, 301-313, 301-314, 302-311, 302-313, 302-314, 303-311, 303-312, 303-313, and 303-314, and at recolor node R5 between virtual nodes 501-511, 501-512, 502-511, 502-512, 503-511, 503-512, 504-511, and 504-512. The cost value for new device installation assumed for solution 328 favors adding a new O-E-O regenerator in auxiliary graph 200. The evaluation results in a new O-E-O regenerator added at recolor node R5 between virtual nodes 502-512 and solution 328 results in an overall cost of 72 and a routing path of S-113-303-314-504-512-702-D, and includes a new O-E-O regenerator at recolor node R5. In solution 328, the O-E-O regenerator between virtual nodes 504 and 512 upshifts a wavelength channel by 2 slots (N=+2). Solution 328 may represent a strategy to maximize the network fill rate but install O-E-O regenerators for wavelength shifting.

In FIG. 3, solution 330 for auxiliary graph 200 results as the lowest cost optical path under the following assumptions:
the cost of wavelength shifting with new device installation is equal to 25;
cost of conversion by an existing wavelength shifter=0 (no sharing cost); and
cost of no-recolor links=0.

To obtain solution 330, installation of new optical wavelength shifters is evaluated at recolor node R3 between virtual nodes 301-313, 301-314, 302-311, 302-314, 303-311, 303-312, and 303-313, and at recolor node R5 between virtual nodes 501-511, 501-512, 502-512, 503-511, 504-511, and 504-512. The cost value for new device installation assumed for solution 330 balances adding a new optical wavelength shifter in auxiliary graph 200 with maximizing the network fill rate using existing wavelength slots. Solution 330 results in the same optical path as solution 322. Solution 330 may represent a compromise approach that favors all optical wavelength shifting but also seeks to maximize the network fill rate.

In FIG. 3, solution 332 for auxiliary graph 200 results as the lowest cost optical path under the following assumptions:
the cost of wavelength shifting with new O-E-O regenerator installation is equal to 25; and
cost of conversion by an existing wavelength shifter=0 (no sharing cost).

To obtain solution 332, installation of new O-E-O regenerator wavelength shifters is evaluated at recolor node R3 between virtual nodes 301-312, 301-313, 301-314, 302-311, 302-313, 302-314, 303-311, 303-312, 303-313, and 303-314, and at recolor node R5 between virtual nodes 501-511, 501-512, 502-511, 502-512, 503-511, 503-512, 504-511, and 504-512. The cost value for new device installation assumed for solution 328 favors adding a new O-E-O regenerator in auxiliary graph 200. The evaluation results in a new O-E-O regenerator added at recolor node R5 between virtual nodes 504-512. Solution 332 is similar to solution 328, but with an overall cost of 130. Solution 332 may represent a compromise approach that favors O-E-O regeneration for wavelength shifting but also seeks to maximize the network fill rate.

Figure 4A:
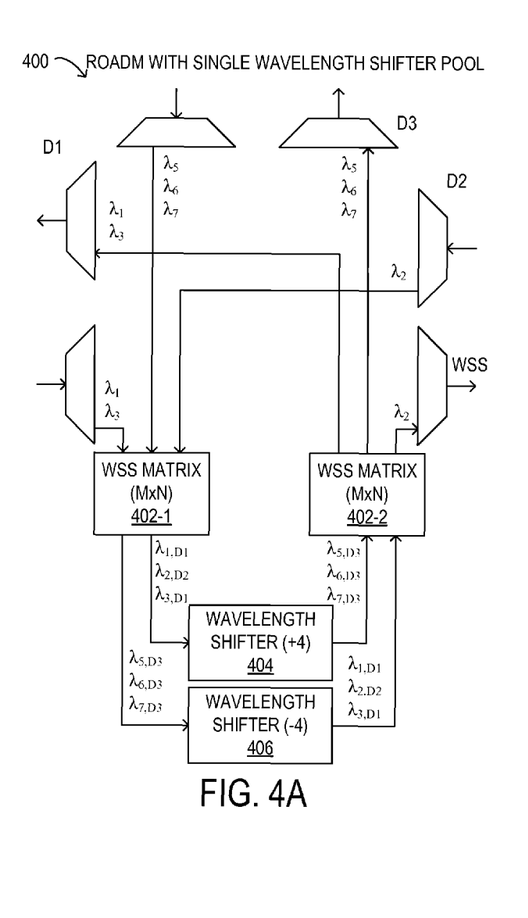
FIGS. 4A and 4B are block diagrams of selected elements of embodiments of ROADM nodes including wavelength shifters.
Figure 4B:
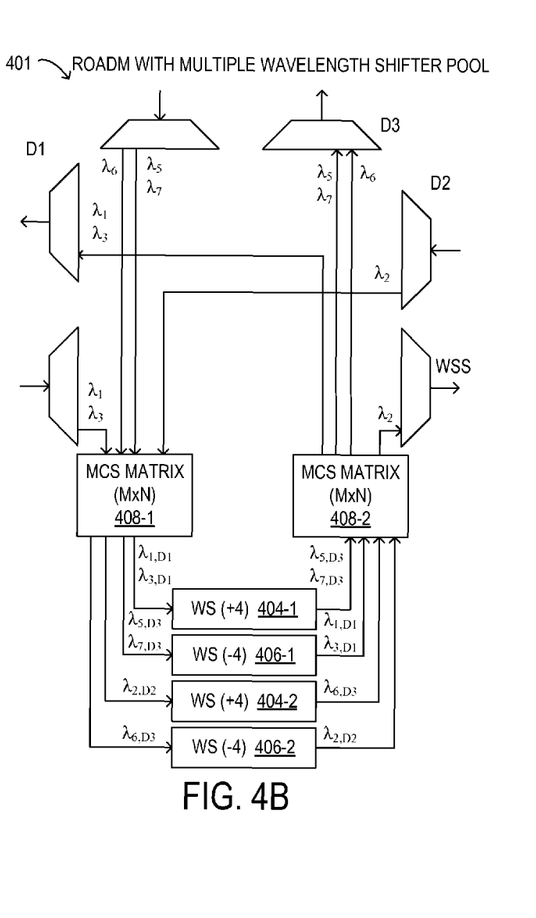

Referring now to FIGS. 4A and 4B, selected elements of example embodiments of ROADM nodes 400 and 401 are shown, respectively. FIG. 4A illustrates a ROADM node 400 having 3 degrees (D1, D2, D3) and employing WSS matrices 402-1 and 402-2 to enable wavelength shifting from any input degree to any output degree. Accordingly, ROADM node 400 may operate with two wavelength shifters 404 and 406, for N-+4 and N=-4, respectively. FIG. 4B illustrates a ROADM node 401 having 3 degrees (D1, D2, D3) and employing MCS matrices 408-1 and 408-2 that enable wavelength shifting from any one input degree to any one output degree for a given link. Accordingly, ROADM node 401 may operate with two wavelength upshifters 404-1 and 404-2 for N-+4 and two wavelength downshifters 406-1 and 406+2 for N=-4.

Figure 5:
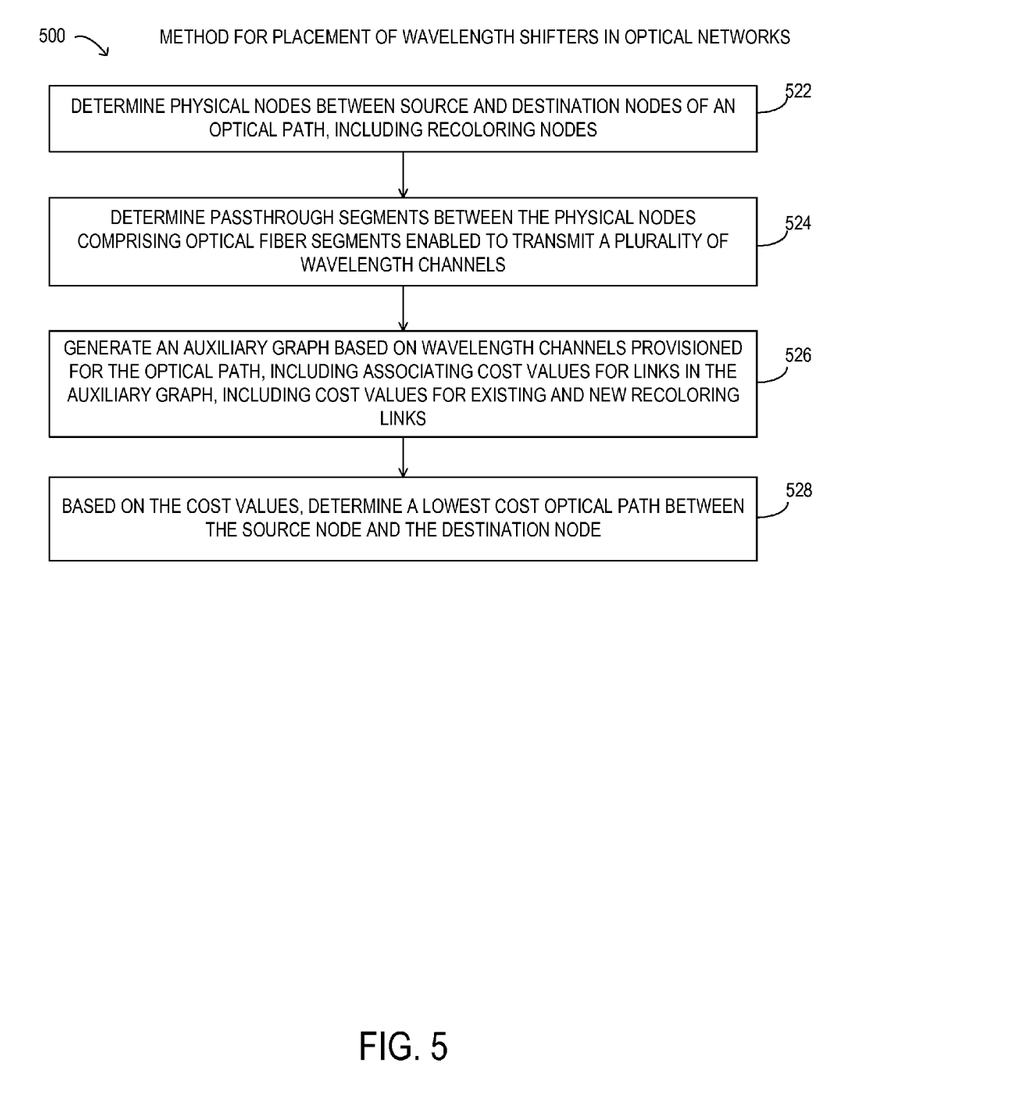
FIG. 5 is a flow chart of selected elements of a method for placement of wavelength shifters in optical networks.

Referring now to FIG. 5, a block diagram of selected elements of an embodiment of method 500 for placement of wavelength shifters in optical networks, as described herein, is depicted in flowchart form. Method 500 may be performed using path computation engine 602 in FIG. 6. It is noted that certain operations described in method 500 may be optional or may be rearranged in different embodiments.

Method 500 may begin, at step 522, by determining physical nodes between source and destination nodes of an optical path, including recoloring nodes. At step 524, passthrough segments are determined between the physical nodes, the passthrough segments comprising optical fiber segments enabled to transmit a plurality of wavelength channels. At step 528, an auxiliary graph is generated based on wavelength channels provisioned for the optical path, including associated cost values for links in the auxiliary graph, including cost values for existing and new recoloring links. At step 528, based on the cost values, a lowest cost optical path is determined between the source node and the destination node.

Figure 6:
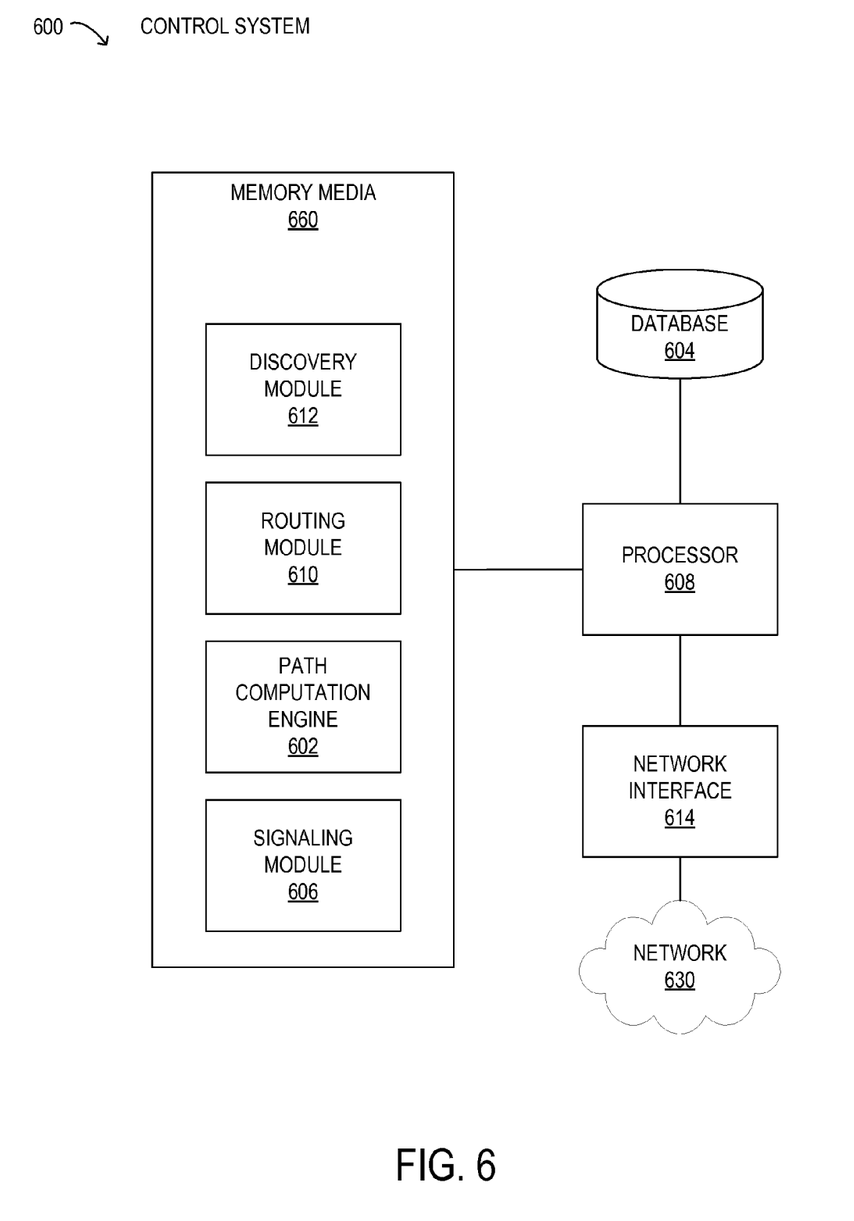
FIG. 6 is a block diagram of selected elements of an embodiment of a control system for an optical network.

Referring now to FIG. 6, a block diagram of selected elements of an embodiment of control system 600 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 600 may work together to automatically establish services within the optical network. Discovery module 612 may discover local links connecting to neighbors. Routing module 610 may broadcast local link information to optical network nodes while populating database 604. When a request for service from the optical network is received, path computation engine 602 may be called to compute a network path using database 604. This network path may then be provided to signaling module 606 to establish the requested service.

As shown in FIG. 6, control system 600 includes processor 608 and memory media 660, which may store executable instructions (i.e., executable code) that may be executable by processor 608, which has access to memory media 660. Processor 608 may execute instructions that cause control system 600 to perform the functions and operations described herein. For the purposes of this disclosure, memory media 660 may include non-transitory computer-readable media that stores data and instructions for at least a period of time. Memory media 660 may comprise persistent and volatile media, fixed and removable media, and magnetic and semiconductor media. Memory media 660 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 660 is operable to store instructions, data, or both. Memory media 660 as shown includes sets or sequences of instructions that may represent executable computer programs, namely, path computation engine 602, signaling module 606, discovery module 612, and routing module 610. As described herein, path computation engine 602, in conjunction with signaling module 606, discovery module 612, and routing module 610, may represent instructions or code for implementing various algorithms according to the present disclosure.

Also shown included with control system 600 in FIG. 6 is network interface 614, which may be a suitable system, apparatus, or device operable to serve as an interface between processor 608 and network 630. Network interface 614 may enable control system 600 to communicate over network 630 using a suitable transmission protocol or standard. In some embodiments, network interface 614 may be communicatively coupled via network 630 to a network storage resource. In some embodiments, network 630 may be an embodiment of at least certain portions of optical network 101. Network 630 may also include certain portions of a network using galvanic or electronic media. In certain embodiments, network 630 may include at least certain portions of a public network, such as the Internet. Network 630 may be implemented using hardware, software, or various combinations thereof.

In certain embodiments, control system 600 may interface with a person (i.e., a user) and receive data about the optical signal transmission path. For example, control system 600 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 600 may receive data about the optical signal transmission path from a device such as another computing device or a network element, for example via network 630.

As shown in FIG. 6, in some embodiments, discovery module 612 may receive data concerning an optical signal transmission path in an optical network and may be responsible for discovery of neighbors and links between neighbors. In other words, discovery module 612 may send discovery messages according to a discovery protocol, and may receive data about the optical signal transmission path. In some embodiments, discovery module 612 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 6, routing module 610 may be responsible for propagating link connectivity information to various nodes within an optical network, such as optical network 101. In particular embodiments, routing module 610 may populate database 604 with resource information to support traffic engineering, which may include link bandwidth availability. Accordingly, database 604 may be populated by routing module 610 with information usable to determine a network topology of an optical network.

Path computation engine 602 may use the information provided by routing module 610 to database 604 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 602 may consider the interplay between the transmission degradation factors. In various embodiments, path computation engine 602 may generate values for specific transmission degradation factors. Path computation engine 602 may further store data describing the optical signal transmission path in database 604.

In FIG. 6, signaling module 606 may provide functionality associated with setting up, modifying, and tearing down end-to-end networks services in an optical network, such as optical network 101. For example, when an ingress node in the optical network receives a service request, control system 600 may employ signaling module 606 to request a network path from path computation engine 602 that may be optimized according to different criteria, such as bandwidth, cost, etc. When the desired network path is identified, signaling module 606 may then communicate with respective nodes along the network path to establish the requested network services. In different embodiments, signaling module 606 may employ a signaling protocol to propagate subsequent communication to and from nodes along the network path.

In operation of control system 600, a feature of optical path computation may include the calculation of end-to-end reachable paths. As noted previously, a directly reachable path may represent a path between a source node and a destination node in an optical network for which an optical signal between the source node and the destination node may be transmitted and received through purely optical components. Such a directly reachable path may stand in contrast, for example, to an indirectly reachable path between the source node and the destination node that involves electrically regenerating the optical signal using O-E-O regenerators, referred to herein as simply 'regenerators', before reaching the destination. An indirectly reachable path may include a plurality of regenerators. Thus, an end-to-end reachable path may include a path from a source node, to a first regenerator node, to at least one second regenerator node, and finally, to a destination node. Path computation engine 602 may find end-to-end reachable paths that integrate a minimum or an otherwise-specified number of regenerators, as well as satisfying other path constraints such as latency and cost.

Path computation engine 602 may further generate an auxiliary graph and allow application of different cost metrics to determine placement of wavelength shifters in optical networks according to desired criteria and network utilization strategies, as disclosed herein.

As disclosed herein, methods and systems enable optimized placement of wavelength shifters in optical networks. The wavelength shifters may include O-E-O regenerators for a single wavelength and all optical wavelength shifters for one or more wavelengths. An auxiliary graph is used to represent various links in a provisioned optical path. By applying cost values to each of the links, different types of optimizations for network resource utilization may be realized.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for placement of wavelength shifters in optical networks, the method comprising:

for an optical path from a source node to a destination node in an optical network, determining physical nodes between the source node and the destination node, the physical nodes including the source node, the destination node, recoloring nodes, and passthrough nodes, the passthrough nodes represent passthrough segments of optical fiber enabled to transmit a plurality of wavelength channels;

generating an auxiliary graph for the optical path, the auxiliary graph based on wavelength channels provisioned between the source node and the destination node, further comprising:

based on the wavelength channels provisioned at the physical nodes and the passthrough segments, generating a first virtual terminal node corresponding to the source node, generating a second virtual terminal node corresponding to the destination node, generating a set of virtual output nodes corresponding to the first virtual terminal node, generating a set of virtual input nodes corresponding to the second virtual terminal node, and generating virtual input nodes and virtual output nodes corresponding to each of the recoloring nodes;

generating, at the source node, source links between the first virtual terminal node and the set of virtual output nodes corresponding to the first virtual terminal node;

generating, at the destination node, destination links between the second virtual terminal node and the set of virtual input nodes corresponding to the second virtual terminal node;

generating passthrough links corresponding to the passthrough segments, each of the passthrough links indicative of a wavelength channel respectively provisioned at the passthrough segment;

generating, at each of the recoloring nodes, recoloring links between the virtual input nodes and the virtual output nodes corresponding to each of the recoloring nodes, types of recoloring links comprising no-recolor links, optical-electrical-optical (O-E-O) regeneration links, and optical wavelength shifter links, wherein the recoloring links are indicative of recoloring functionality existing at each of the recoloring nodes;

associating a cost value, respectively, with each of the source links, each of the destination links, each of the passthrough links, each of the no-recolor links, and each of the recoloring links, wherein the cost value for the passthrough links is respectively associated with the wavelength channel for each of the passthrough links;

summing the cost values to produce a cost of the optical path;

revising the auxiliary graph to add new recoloring links that represent the installation of a new wavelength shifter to one of the recoloring nodes in the optical path, the new recoloring links including new O-E-O regeneration links and new optical wavelength shifter links;

associating a new cost value, respectively, for each new recoloring link added to the revised auxiliary graph; and summing the cost values of the revised auxiliary graph to produce a cost of the optical path with the installation of the new wavelength shifter;

based on the cost of the optical path and the cost of the optical path with the installation of the new wavelength shifter, determining a lowest cost optical path between the source node and the destination node; and transmitting, to nodes that comprise the lowest cost optical path, communication via a signaling protocol to establish a network service along the lowest cost optical path.

2. The method of claim 1, wherein the source links, the destination links, and the no-recolor links are associated with the cost value of zero.

3. The method of claim 1, wherein the optical wavelength shifter links are associated with the cost value of zero.

4. The method of claim 1, wherein the new cost value for the new optical wavelength shifter links is selected to be greater than the cost value for the passthrough link having a highest wavelength channel times a number of hops in the optical path.

5. The method of claim 1, wherein the new cost value for the new optical wavelength shifter links is selected to be less than the cost value for the passthrough link having a lowest wavelength channel and less than a cost difference between consecutive wavelength channels.

6. The method of claim 1, wherein the new cost value for the new optical wavelength shifter links is selected to be equal to the cost value for a passthrough link.

7. The method of claim 1, wherein the recoloring nodes include reconfigurable optical add-drop multiplexer nodes using wavelength selective switches in a matrix switch configuration.

8. The method of claim 1, wherein the recoloring nodes include reconfigurable optical add-drop multiplexer nodes using multicast switches.

9. A control system for placement of wavelength shifters in optical networks, the control system comprising a processor having access to memory media storing instructions executable by the processor to:

for an optical path from a source node to a destination node in an optical network, determine physical nodes between the source node and the destination node, the physical nodes including the source node, the destination node, recoloring nodes, and passthrough nodes, the passthrough nodes represent passthrough segments of optical fiber enabled to transmit a plurality of wavelength channels;

generate an auxiliary graph for the optical path, the auxiliary graph based on wavelength channels provisioned between the source node and the destination node, further comprising:

based on the wavelength channels provisioned at the physical nodes and the passthrough segments, generate a first virtual terminal node corresponding to the source node, generating a second virtual terminal node corresponding to the destination node, generating a set of virtual output nodes corresponding to the first virtual terminal node, generating a set of virtual input nodes corresponding to the second virtual terminal node, and generating virtual input nodes and virtual output nodes corresponding to each of the recoloring nodes;

generate, at the source node, source links between the first virtual terminal node and the set of virtual output nodes corresponding to the first virtual terminal node;

generate, at the destination node, destination links between the second virtual terminal node and the set of virtual input nodes corresponding to the second virtual terminal node;

generate passthrough links corresponding to the passthrough segments, each of the passthrough links indicative of a wavelength channel respectively provisioned at the passthrough segment;

generate, at each of the recoloring nodes, recoloring links between the virtual input nodes and the virtual output nodes corresponding to each of the recoloring nodes, types of recoloring links comprising no-recolor links, optical-electrical-optical (O-E-O) regeneration links, and optical wavelength shifter links, wherein the recoloring links are indicative of recoloring functionality existing at each of the recoloring nodes;

associate a cost value, respectively, with each of the source links, each of the destination links, each of the passthrough links, each of the no-recolor links, and each of the recoloring links, wherein the cost value for the passthrough links is respectively associated with the wavelength channel for each of the passthrough links;

sum the cost values to produce a cost of the optical path;

revise the auxiliary graph to add new recoloring links that represent the installation of a new wavelength shifter to one of the recoloring nodes in the optical path, the new recoloring links including new O-E-O regeneration links and new optical wavelength shifter links;

associate a new cost value, respectively, for each new recoloring link added to the revised auxiliary graph; and sum the cost values of the revised auxiliary graph to produce a cost of the optical path with the installation of the new wavelength shifter;

based on the cost of the optical path and the cost of the optical path with the installation of the new wavelength shifter, determine a lowest cost optical path between the source node and the destination node;

transmit, to nodes that comprise the lowest cost optical path, communication via a signaling protocol to establish a network service along the lowest cost optical path.

10. The control system of claim 9, wherein the source links, the destination links, and the no-recolor links are associated with the cost value of zero.

11. The control system of claim 9, wherein the optical wavelength shifter links are associated with the cost value of zero.

12. The control system of claim 9, wherein the new cost value for the new optical wavelength shifter links is selected to be greater than the cost value for the passthrough link having a highest wavelength channel times a number of hops in the optical path.

13. The control system of claim 9, wherein the new cost value for the new optical wavelength shifter links is selected to be less than the cost value for the passthrough link having a lowest wavelength channel and less than a cost difference between consecutive wavelength channels.

14. The control system of claim 9, wherein the new cost value for the new optical wavelength shifter links is selected to be equal to the cost value for a passthrough link.

15. The control system of claim 9, wherein the recoloring nodes include reconfigurable optical add-drop multiplexer nodes using wavelength selective switches in a matrix switch configuration.

16. The control system of claim 9, wherein the recoloring nodes include reconfigurable optical add-drop multiplexer nodes using multicast switches in a matrix switch configuration.

* * * * *